United States Patent [19]

Schonlau et al.

[11] Patent Number: 4,787,684
[45] Date of Patent: Nov. 29, 1988

[54] HYDRAULIC BRAKE SYSTEM, IN PARTICULAR FOR AUTOMOTIVE VEHICLES

[75] Inventors: Juergen Schonlau, Walluf; Horst P. Becker, Frankfurt am Main, both of Fed. Rep. of Germany

[73] Assignee: Alfred Teves GmbH, Frankfurt am Main, Fed. Rep. of Germany

[21] Appl. No.: 62,208

[22] Filed: Jun. 15, 1987

[30] Foreign Application Priority Data

Jun. 19, 1986 [DE] Fed. Rep. of Germany ....... 3620561

[51] Int. Cl.⁴ .............................................. B60T 8/64
[52] U.S. Cl. ..................................... 303/111; 303/116; 303/119
[58] Field of Search ............. 188/181 A; 303/95, 103, 303/110, 111, 114, 116, 119

[56] References Cited

U.S. PATENT DOCUMENTS 4,632,467 12/1986 Kircher et al. ..................... 303/111

Primary Examiner—Duane A. Reger
Attorney, Agent, or Firm—James B. Raden

[57] ABSTRACT

A brake system is disclosed including a tandem master cylinder with a vacuum brake power booster and wheel brakes connected to the tandem master cylinder by brake lines. Each brake line contains a braking pressure modulator of a brake slip control appartaus, and interposed between the braking pressure modulators and the wheel brakes are braking pressure regulators which serve to reduce the pressure in the wheel brakes in relation to the pressure in the brake lines. To avoid impairment of the control behavior in the event of antilock control, the wheel brakes inserted after the braking pressure regulators are connectible by lines and solenoid valves in the braking pressure modulators directly to a return line leading to a supply reservoir.

3 Claims, 1 Drawing Sheet

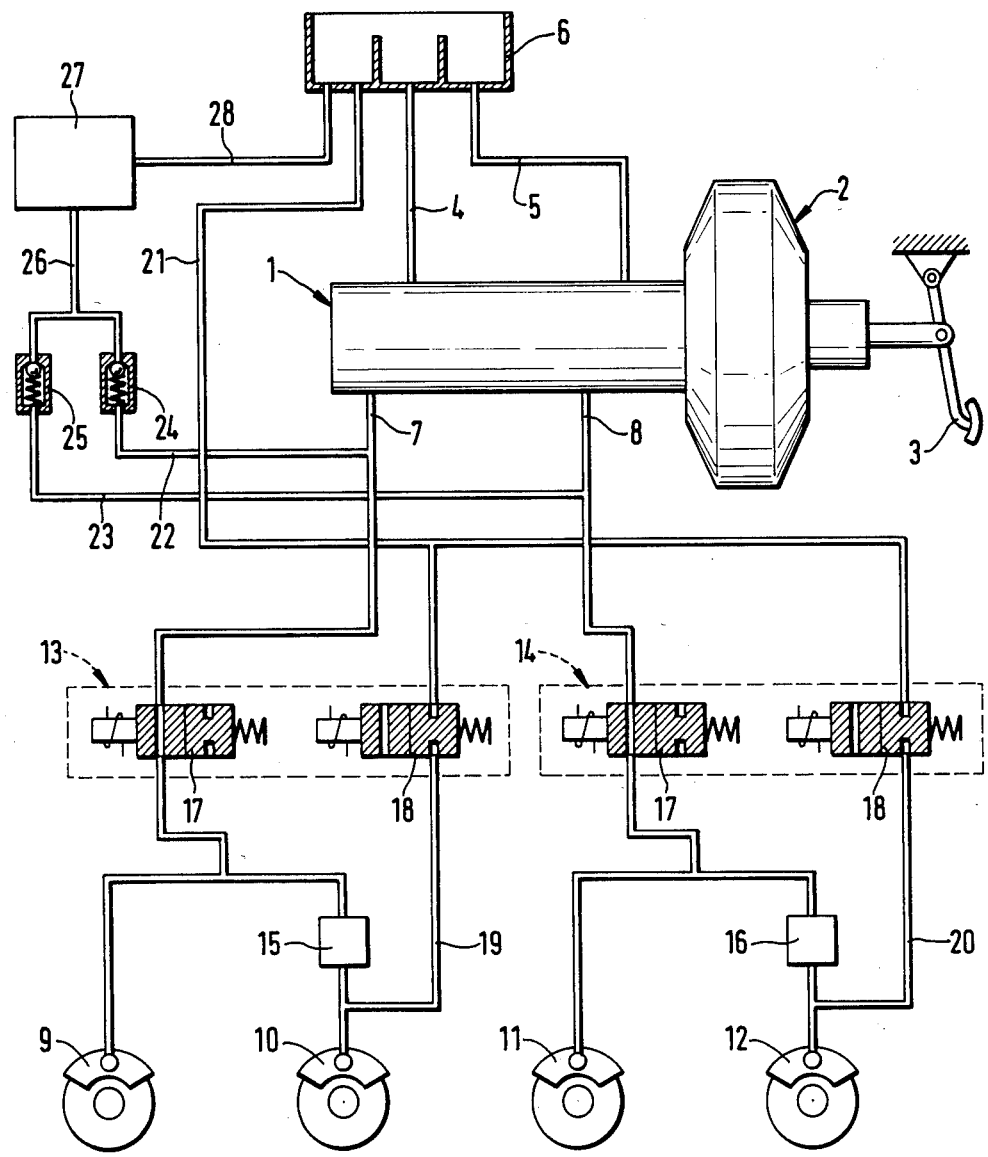

HYDRAULIC BRAKE SYSTEM, IN PARTICULAR FOR AUTOMOTIVE VEHICLES

BACKGROUND OF THE INVENTION

The present invention relates to a hydraulic brake system, and in particular a hydraulic brake system for automotive vehicles. The system includes a braking pressure generator, at least one brake cylinder connected by a brake line to the braking pressure generator and serving to actuate a wheel brake. The system further includes a hydraulic braking pressure regulator which reduces the pressure at the inlet of the brake cylinder in relation to the pressure at the outlet of the brake cylinder.

Brake systems of this type are generally known such as the system disclosed in U.S. Pat. No. 3,838,887. In these brake systems, it is the purpose of the braking pressure regulator on application of the brake to maintain the pressure increase in the system at the rear-wheel brakes lower than the pressure increase in the braking pressure generator and in the other sections of the brake system which are directly connected to the front-wheel brakes so as to correctly distribute the brake forces according to the dynamic wheel load variation and to avoid overbraking of the rear-wheel brakes.

SUMMARY OF THE INVENTION

It is the object of the present invention to provide for a hydraulic brake system of the type referred to hereinabove with a brake slip control apparatus and to provide for an arrangement wherein the braking pressure regulator does not impair brake slip control.

This object is achieved according to the present invention in that the brake line between the braking pressure generator and the inlet of the braking pressure regulator can be closed by a first valve which is normally open and in that the inlet of the brake cylinder which is in parallel with the braking pressure regulator is connectible to an unpressurized reservoir by means of a second valve which is normally closed. Both valves are actuable by a brake slip control apparatus. Accordingly, a hydraulic brake system is provided for which combines the advantages of hydraulic braking pressure control during braking actions under non-wheel slip conditions between the wheel and road surface with the advantages of brake slip control for braking actions during slip conditions. Additionally, an optimal control characteristic is accomplished on the outlet side of the braking pressure regulator by controlling the pressure reduction during operation of the brake slip control apparatus, since the pressure decrease is not influenced by the hysteresis behavior of the braking pressure regulator. On the other hand, the repeated pressure build-up after a pressure decrease by way of the braking pressure regulator ensures that, even on brake slip control, the braking pressure distribution substantially corresponds to the wheel load variation, which has favorable effects on the control behavior during a brake slip control action.

According to the invention, a brake system with brake slip control is provided for including diagonal brake circuits each including one front-wheel brake and one rear-wheel brake and a braking pressure regulator and a pair of first and second valves. The brake cylinder of the front-wheel brake branches off from the brake line between the first valve and the braking pressure regulator. The brake system requires only four valves in addition to the two pressure regulators with the valves controlled by a brake slip control apparatus. The two brakes of each diagonal brake circuit are each controlled jointly in the event of an imminent locked condition.

According to an important feature of the invention, the two valves and the braking pressure regulator can be integrated to form a single braking pressure modulator. The valves are preferably electromagnetically actuable two-way/two-position directional control valves which are controllable pulsewise by the brake slip control apparatus.

BRIEF DESCRIPTION OF THE DRAWING

The invention will be described in detail hereinbelow with reference to the drawing which is a schematic representation of the system according to the invention.

DETAILED DESCRIPTION OF THE PREFERRED EMBODIMENT

The brake system includes a braking pressure generator which is composed of a tandem master cylinder 1 and a vacuum brake power booster 2 which are actuable by means of a brake pedal 3. As is known, the tandem master cylinder 1 accommodates two working chambers isolated from each other, the volume of which can be controlled by two master cylinder pistons with central valves, two supply chambers of the master cylinder are in communication with an unpressurized supply reservoir 6 by lines 4, 5.

The two working chambers of the tandem master cylinder 1 communicate by separate brake lines 7, 8 with wheel brakes 9, 10 and 11, 12, respectively, which each include one braking pressure modulator 13 and 14 of a brake slip control apparatus. A braking pressure regulator 15, 16 is inserted between the braking pressure modulators 13, 14 and the wheel brakes 10, 12. The braking pressure regulators 15, 16 may form an integral unit with the braking pressure modulators 13, 14.

The two braking pressure regulators 15, 16 can be designed in any conventional fashion. For instance, the pressure regulators may be a simple conventional design with a stepped piston, whose smaller effective surface is acted upon by the inlet pressure and whose larger effective surface is acted upon by the outlet pressure, and which is circumvented by a by-pass line that is closed on attainment of a predefined switching pressure by a pressure-responsively switching valve. The switching pressure can b set to a fixed pressure or can be variable in dependence on the load condition of the vehicle. Such braking pressure regulators provide free passage until attainment of the switching pressure. When the switching pressure is exceeded, the outlet pressure will be reduced in relation to the inlet pressure corresponding to the ratio of surface of the stepped piston. Accordingly, the pressure rise characteristic curve of the outlet pressure is flatter than that of the inlet pressure.

The braking pressure modulators 13, 14 each contain two solenoid valves 17, 18 which are controlled by the brake slip control apparatus in order to prevent locking of the wheel brakes. In their initial position, the solenoid valves 17 are opened and the solenoid valves 18 are closed, while their magnet coils are de-energized. The solenoid valves 17 connect the wheel brakes 9, 10, 11 and 12 to the tandem master cylinder 1. The solenoid valves 18 govern a connection leading from the wheel brakes 10, 12 by lines 19, 20 and a common line 21 to the supply reservoir 6.

The wheel brakes 9, 10 and 11, 12, respectively, are connected to a braking pressure modulator 13 and 14, respectively, and are arranged diagonally in relation to the vehicle. The wheel brakes 9, 11 are allocated to the front wheels of the vehicle, while the wheel brakes 10, 12 are allocated to the rear wheels. Accordingly, each brake circuit acts upon one front wheel and one rear wheel arranged diagonally thereto. For supplying the brake system with pressure fluid during a brake slip control action, a pressure line 22, 23 branches off from each brake line 7, 8 and leads to non-return valves 24 an 25, respectively, which are normally closed in the initial position. The valves are connected by a common line 26 with a hydraulic pump unit 27. The inlet of the pump unit 27 communicates by a line 28 to the supply reservoir 6.

The mode of operation of the brake system described is as follows:

When a braking action is initiated by depression of the brake pedal 3, the tandem master cylinder 1 causes a pressure to develop in the brake lines 7, 8 which propagates through the open solenoid valves 17 to the wheel brakes 9, 11 and, further, through the open braking pressure regulators 15, 16 to the wheel brakes 10, 12. As a result, the pressure at the wheel brakes 9, 10, 11 and 12 will rise evenly until the switching pressure of the braking pressure regulators 15, 16 has been attained and the pressure increase at the rear-wheel brakes is reduced in relation to the pressure increase at the front-wheel brakes.

When the braking action is to be terminated, the brake pedal 3 is released and the pressure in the brake lines 7, 8 will decrease. Due to the hysteresis behavior of the braking pressure regulators 15, 16, the pressure decrease at the rear-wheel brakes 10, 12 will commence only after the pressure at the front-wheel brakes has been decreased by a considerable amount.

When the brake slip control apparatus detects an imminent locked condition of a vehicle wheel during a braking action, the pump unit 27 will be switched on. A pressure develops in the line 26 which is in excess of the actuating pressure in the brake lines 7, 8 and the pressure line 22, 23 so that the non-return valves 24, 25 open and pressure fluid delivered by the pump unit 27 is supplied through the pressure lines 22, 23 into the brake lines 7, 8. The pressurized fluid causes the master cylinder pistons of the tandem master cylinder 1 to be shifted back in the brake's release position, while the actuating force at the brake pedal 3 remains constant, until the central valves of the piston in the master cylinder open and, thereby, retain the pressure in the working chambers on a level which corresponds to the pressure level predetermined by the actuating force on the brake pedal 3. The initial position of the brake pedal 3 attained whereby an alert position is achieved and braking action can be continued even on failure of the pump unit 27.

The pedal is not required to be shifted back if the lines 7 and 8 contain separating valves (solenoid valves or hydraulically actuated valves) which will position the pedal upon the beginning of a control action.

Simultaneously with the switching-on of the pump unit 27, the brake slip control apparatus will drive the solenoid valves 17, 18 of that brake circuit in which an imminent locked condition was detected in accordance with a predefined control characteristics, so as to prevent locking of the wheel brakes connected to the brake circuit by periodic increase and decrease of the pressure. The pressure fluid volume needed for these control actions is supplied by the pump unit 27.

Since one front-wheel brake 9 and 10, respectively, and one rear-wheel brake 10, 12 are coupled to one another, upon the occurrence of an imminent locked condition at the rear-wheel brake 10, the pressure decrease controlled by the braking pressure modulator 13 will become effective at the front-wheel brake 9, even if no tendency to lock is prevailing at the front-wheel brake 9. In order to keep the reduction of braking effect brought about by the pressure decrease as small as possible, it is preferable to decrease the pressure as far as it is necessary for preventing wheel lock and to keep the duration of the pressure-decrease phase as short as possible. In the brake system described, this will be attained in that the pressure decrease is performed by connecting the solenoid valves 18 through the lines 19, 20 in parallel to the braking pressure regulators 15, 16 so that the hysteresis of the braking pressure regulator is not allowed to take effect. Therefore, the pressure decrease in the brake circuits connected after the braking pressure modulators 13, 14 can also be less upon an imminent locked condition at a rear-wheel brake than the pressure decrease which would be necessary for a response of the braking pressure regulators 15, 16 at their inlet side. Upon termination of the pressure-decrease phase, the solenoid valves are switched back to their initial position, thereby allowing the pressure in the controlled brake circuit to re-increase until a new pressure decrease becomes necessary.

What is claimed is:

1. A hydraulic brake system of the type for automotive vehicles, comprising a braking pressure generator, at least one brake cylinder connected by a brake line to the braking pressure generator and serving to actuate a wheel brake, a hydraulic braking pressure regulator in said brake line, a normally open first valve in said brake line, an inlet of the brake cylinder in parallel to the braking pressure regulator connected between said braking pressure regulator at said brake cylinder to an unpressurized reservoir through a normally closed second valve, said first valve and said second valve being actuatable by a brake slip control apparatus, actuation of said brake slip control apparatus causing hydraulic braking pressure at said brake cylinder to decrease by directing hydraulic pressure from said brake cylinder to said unpressurized reservoir bypassing said braking pressure regulator whereby the inherent hysteresis of said braking pressure regulator is not effective during said pressure decrease.

2. The hydraulic brake system as claimed in claim 1, wherein said brake system includes two diagonal brake circuits, each circuit including one front-wheel brake and one rear-wheel brake, one braking pressure regulator and one first and one second valve, a brake cylinder of each of the front-wheel brakes connected to the brake line between the respective first valve and the respective braking pressure regulator.

3. A brake system as claimed in claim 2, wherein the second valve is actuatable in a manner for attaining an intermittent pressure decrease.

* * * * *